United States Patent [19] [11] 4,345,781
Suzuki et al. [45] Aug. 24, 1982

[54] WEBBING SLIDER LOCK MECHANISM

[75] Inventors: Ichiro Suzuki, Nagoya; Masanao Motonami; Hisashi Ogawa, both of Toyota, all of Japan

[73] Assignee: Toyota Jidosha Kogyo Kabushiki Kaisha, Toyota, Japan

[21] Appl. No.: 148,277

[22] Filed: May 9, 1980

[30] Foreign Application Priority Data

May 16, 1979 [JP] Japan .............................. 54-66186[U]

[51] Int. Cl.³ .............................................. B60R 21/10
[52] U.S. Cl. ..................................... 280/802; 280/804; 297/468
[58] Field of Search ................ 280/802, 804; 297/468, 297/469, 476, 479

[56] References Cited

U.S. PATENT DOCUMENTS 4,200,308  4/1980  Irwin ................................... 280/804
4,213,652  7/1980  Irwin ................................... 280/804
4,268,068  5/1981  Suzuki ................................. 280/804

Primary Examiner—Robert R. Song
Assistant Examiner—John A. Carroll
Attorney, Agent, or Firm—Stevens, Davis, Miller & Mosher

[57] ABSTRACT

The webbing slider lock mechanism according to the present invention comprises: a slider movably received in a sliding groove of a guide rail laid in a vehicle and connected to an end of an occupant restraining webbing; a driving member movably received in a driving groove of the guide rail and connected to the slider in a manner to be movable by a given length relative to the slider in a direction of travel of the slider; a release arm disposed in a manner to be projectable into the driving groove at the side of a retracting end portion of the guide rail in a biased condition and adapted to abut against the side portion of the driving member to be pushed out of the driving groove; and a locking lever disposed below the position of the release arm at the side of retracting end portion of the guide rail in a manner to be projectable to lock the slider and connected to the release arm in a manner to be retractable from the sliding groove.

9 Claims, 4 Drawing Figures

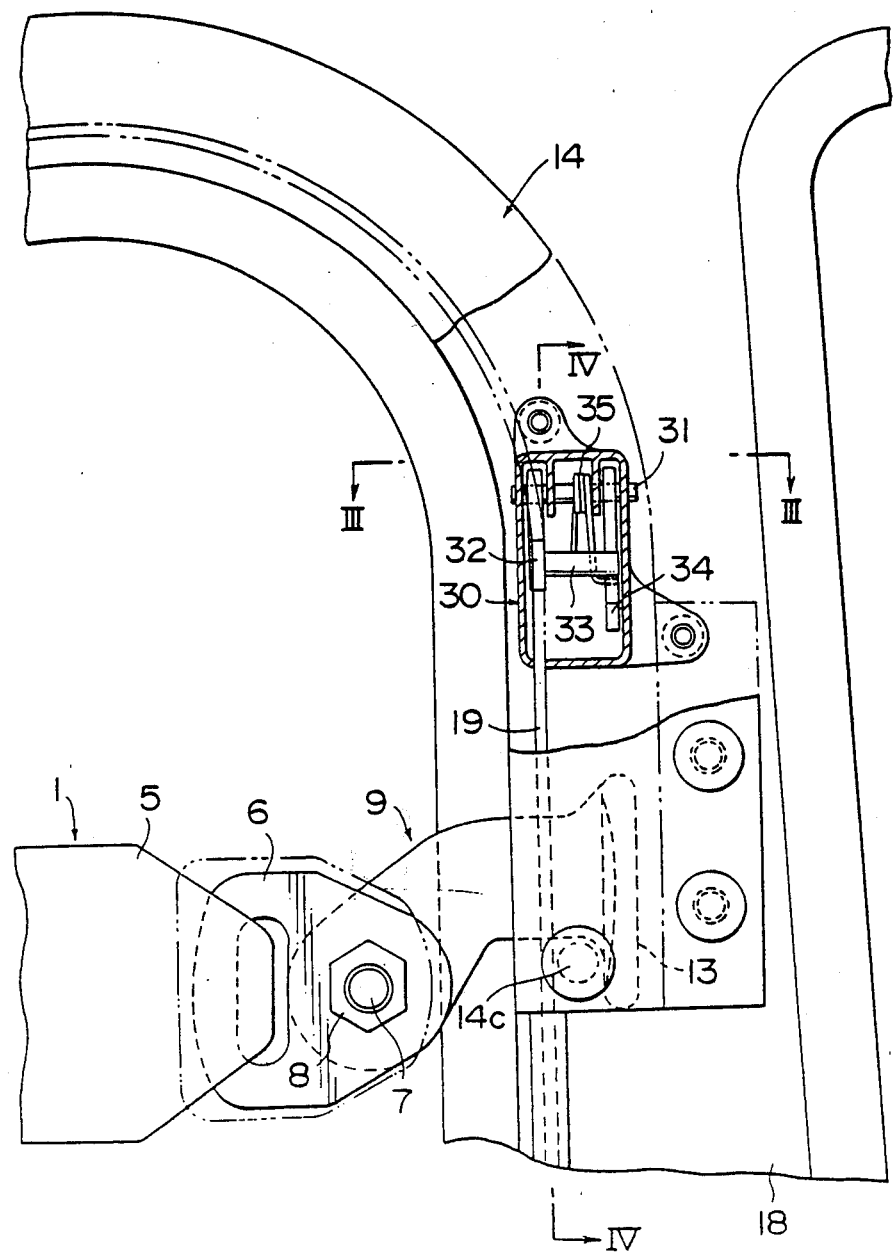

WEBBING SLIDER LOCK MECHANISM

BACKGROUND OF THE INVENTION

1. Field of the Invention

The present invention relates to a webbing slider lock mechanism for use in a seatbelt system in which a webbing slider is moved along a guide rail, capable of preventing the movement of the webbing slider as necessary.

2. Description of the Prior Art

Heretofore, there have been proposed automatic fastening type seatbelt systems capable of automatically fastening a restraining web to an occupant of a vehicle upon his entering the vehicle, so that the webbing can be reliably fastened to the occupant, thereby improving the safety of the occupant. The seatbelt system as described above is constructed such that a slider, with which an end of the occupant restraining webbing is engaged, is caused to travel along a guide rail provided in the vehicle, so that the webbing can be automatically fastened to or unfastened from the occupant. In the automatic fastening seatbelt system of the type as described, after the slider has moved to fasten the webbing to the occupant, it is necessary to prepare for an emergency of the vehicle by preventing the movement of the slider. Particularly, if the slider moves at a collision of the vehicle, the restraint of the occupant becomes imperfect, and hence, it is necessary that, after the automatic fastening of the webbing, the slider should be reliably locked and, when the occupant leaves the vehicle, the slider should be quickly unlocked to make the slider movable.

SUMMARY OF THE INVENTION

This invention has been developed to obviate the abovedescribed problems, and has as its object the provision of a webbing slider lock mechanism simplified in construction and capable of reliably locking or unlocking a webbing slider.

To attain the abovedescribed object, the webbing slider lock mechanism according to the present invention includes: a slider movably received in a sliding groove of a guide rail laid in a vehicle body and connected to an end of an occupant restraining webbing; a driving member movably received in a driving groove of the guide rail and connected to the slider in a manner to be movable by a given value relative to the slider in a direction of travel of the slider; a release arm disposed in a manner to be projectable into the driving groove at the side of a retracting end portion of the guide rail in a biased condition and adapted to abut against the side portion of the driving member to be pushed out of the driving groove; and a locking lever disposed below the position of the release arm at the side of retracting end portion of the guide rail in a manner to be projectable into the sliding groove in a biased condition to lock the slider and connected to the release arm in a manner to be retractable from the sliding groove.

BRIEF DESCRIPTION OF THE DRAWINGS

The abovementioned features and object of the present invention will become more apparent with reference to the following description, taken in conjunction with the accompanying drawings, wherein like reference numerals denote like elements, and in which:

FIG. 2 is a side view enlargedly showing the essential portions in FIG. 1;

DETAILED DESCRIPTION OF THE INVENTION

Description will hereunder be given of an embodiment of the present invention with reference to the drawings.

Figure 1:
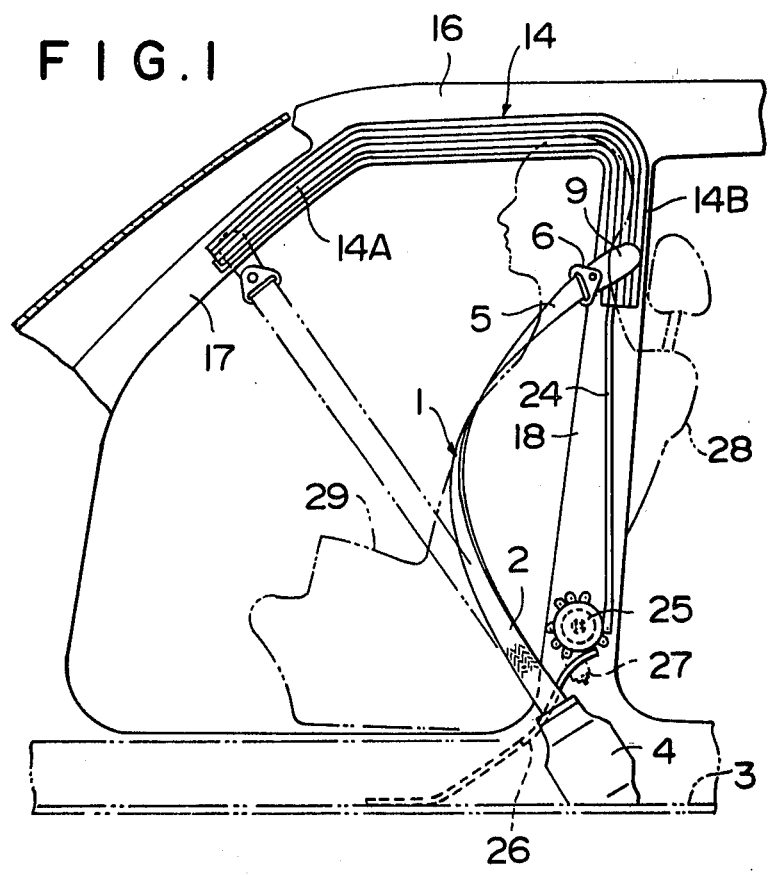
FIG. 1 is a side view showing the webbing slider lock mechanism according to the present invention.

Referring to FIG. 1, the inner end portion 2 of the occupant restraining webbing 1 is wound up by a retractor 4 secured to a floor member 3 at the substantially central portion of the vehicle. This retractor 4 is the so-called emergency locking retractor provided therein with an inertia lock mechanism for suddenly stopping the windoff of the webbing 1 only in an emergency of the vehicle.

Figure 3:
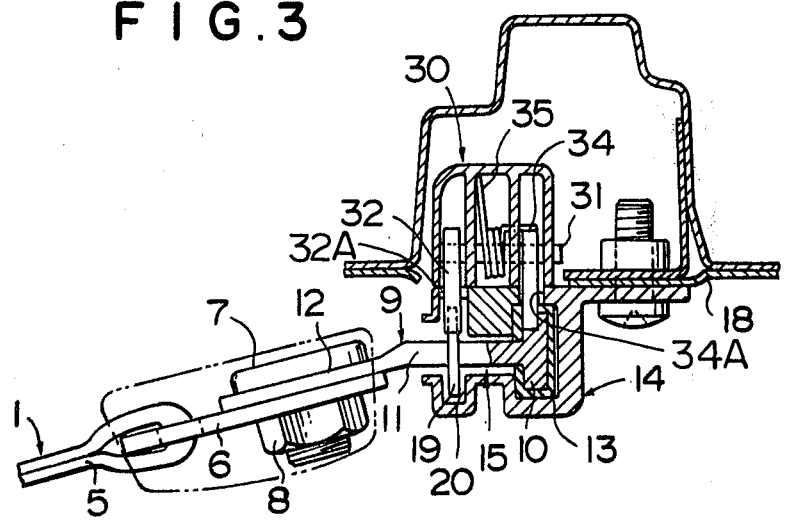
FIG. 3 is a sectional view taken along the line III—III in FIG. 2.

On the other hand, the outer end portion 5 of the webbing 1 is turned back at an anchor plate 6, and then, sewn onto the webbing, as shown in FIGS. 2 and 3. This anchor plate 6 is rotatably or fixedly secured to the end of a slider 9 through a bolt 7 and nut 8. The slider 9 comprises a head 10, a body 11 suspended from the central portion in cross-section of the head 11 and a leg 12 bendingly extended from the body 11. The head 10 of the slider 9 is covered from outside by shoes 13 made of synthetic resin such as nylon, which is low in frictional resistance, excellent in wear resistance, thermal resistance, cold resistance and constant in physical properties. Namely, the head 10 and body 11 of the slider 9 are movably received in a sliding groove 15 of a guide rail 14 laid on a vehicle body, and smoothly movable through the shoes 13.

Here, the intermediate portion of the guide rail 14 is adapted to be located substantially horizontally to a roof-side 16, an advancing end portion 14A of the guide rail 14 is inclined along a front pillar 17 and a retracting end portion 14B is disposed vertically along a center pillar 18, an anchor pin 14C is fixed to the end of the retracting end portion 14B in a manner to penetrate through the sliding groove 15, and the anchor pin 14C can stop the movement of the head 10 of the slider 9.

Figure 4:
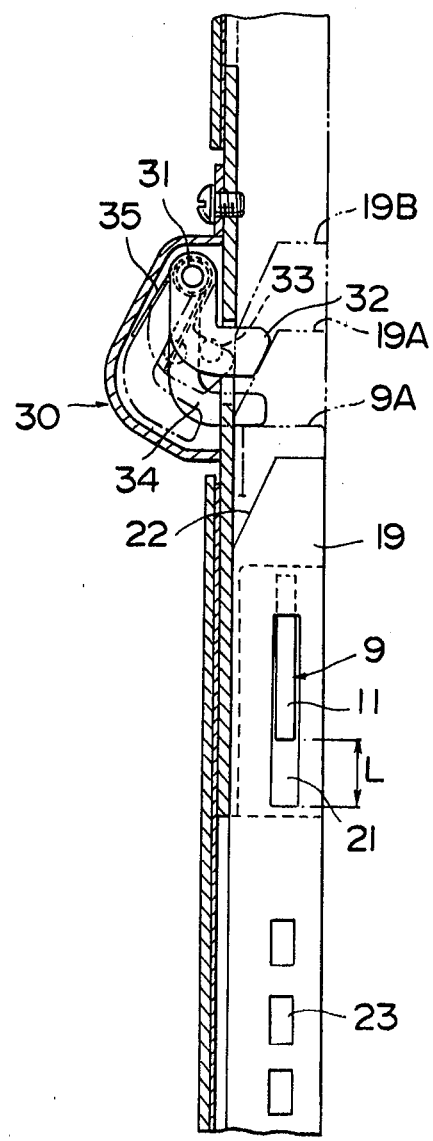
FIG. 4 is a sectional view taken along the line IV—IV in FIG. 2.

Furthermore, a driving tape 19 as a driving member is inserted into the intermediate portion of the body 11 of the slider 9, and the driving tape 19 is movably received in a tape groove 20 as a driving groove perpendicularly intersecting the sliding groove 15. A fastening hole 21 provided at a portion close to the end of the driving tape 19 is located in the body 11 of the slider 9, and, as shown in FIG. 4, the fastening hole 21 has a looseness L as an allowance length in the traveling directions of the driving tape 19 and the body 11 of the slider 9, so that the driving tape 19 and the body 11 of the slider 9 can relatively move in the traveling directions by the allowance L. Furthermore, an inclined side portion 22 is formed at the forward end of the driving tape 19, and a plurality of openings 23 are formed in the longitudinal direction of the intermediate portion of the driving tape 19.

This driving tape 19 is guided in a tape guide 24 connected to the end of the retracting end portion 14B of the guide rail 14 and suspended along the center pillar 18. Further, the tape guide 24 is connected to a sprocket housing 25 at the lower portion of the center pillar 18, at the openings 23 of the driving tape 19 guided in the tape guide 24 is meshed with a sprocket (not shown) provided in the sprocket housing 25, and the excess portion of the driving tape 19 is guided within a tape guide 26.

The sprocket in the sprocket housing 25 is adapted to be driven by a motor 27 secured to the center pillar 18. The motor 27 moves the driving tape 19 along the tape guides 24, 26 and in the tape groove 20 of the guide rail 14, and also moves the anchor plate 6 and webbing 1 through the slider 9.

Consequently, in the case this slider 9 is moved toward the retracting end portion 14B of the guide rail 14 as indicated by solid lines in FIG. 1, the webbing 1 can be fastened to an occupant 29 seated at a seat 28. Furthermore, in the case the slider 9 is moved toward the advancing end portion 14A of the guide rail 14 by the motor 27 as indicated by two-dot chain lines in FIG. 1, the webbing 1 can be separated from the seat 28 and automatically unfastened from the occupant 29.

In addition, the motor 27 is adapted to be driven by detecting the seated condition of the occupant. For example, the motor 27 is rotated to cause the driving tape 19 to ascend along the center pillar 18 when a door is opened for entering or leaving the vehicle, and, rotated to cause the driving tape 19 to move in a direction opposite to the above when the door is closed.

A housing 30 is provided above a position where the slider 9 is entirely received at the upper portion of the center pillar 18, i.e., at the retracting end portion 14B of the guide rail 14 and the end portion of the driving tape 19 is stopped. The housing 30 holds a pivot 31 penetrating therethrough, and a release arm 32 is rotatably supported on a portion of the pivot 31. The forward end of the release arm 32 is disposed in a manner to be projectable into the tape groove 20 through a window 32A provided in the guide rail 14. This release arm 32, when the forward end thereof abuts against the side portion of the driving tape 19, is adapted to be pushed out of the tape groove 20 and received in the housing 30. In addition, a connecting shaft 33 is projected sideways from the side portion of this release arm 32.

Furthermore, a locking lever 34 is rotatably supported on another portion of the pivot 31, and the forward end of the locking lever 34 is disposed in a manner to be projectable into the sliding groove 15 of the guide rail 14 through a window 34A in a condition of being biased by a torsional coil spring 35 at a position below the forward end of the release arm 32. Here, the locking lever 34 presses the connecting shaft 33 and is operated in association with the release arm 32 in a condition of being biased by the spring 35. Additionally, the locking lever 34 is engageable with the upper surface of the shoe 13 crowned on the head 10 of the slider 9 in a condition of its forward end being projected into the sliding groove 15 through the window 34A.

The operation of the abovedescribed embodiment will be given in following description. When the occupant 29 is seated at the seat 28, the motor 27 rotates the sprocket, whereby the driving tape 19 is moved in the longitudinal direction thereof, so that the slider 9 moves from a position indicated by two-dot chain lines to a position indicated by solid lines in FIG. 1, i.e., from the advancing end portion 14A to the retracting end portion 14B of the guide rail 14.

Here, the forward end of the release arm 32 is in a condition of abutting against the side portion of the driving tape 19, and consequently, the locking lever 34 is received in the housing 30 against the biasing force of the spring 35, and the slider 9 is smooth moved without interfering with the locking lever 34 to the retracting position, where it will be stopped by the anchor pin 14C. Upon the completion of the travel of the slider 9 to the retracting end portion 14B of the guide rail 14 as described above, the release arm 32 under the biasing force of the spring 35 progressively enters the tape groove 20 along the inclined side portion 22 of the driving tape 19, and at the same time, the locking lever 34 enters the sliding groove 15.

The webbing 1 is automatically fastened to the occupant as described above, and the occupant can change his driving posture by winding off the webbing 1 from the retractor 4 during normal running condition of the vehicle.

In case the vehicle has fallen into a collision, an inertia sensor in the retractor 4 suddenly stops the windoff of the webbing 1, so that the occupant can be reliably restrained by the webbing 1. Namely, the slider 9 is disposed to the retracting end portion 14B, which is the vertical portion of the guide rail 14, whereby the slider 9 does not move forward in the vehicle, so that the outer end portion 5 of the webbing 1 can be reliably supported by the center pillar 18.

In addition, in case the vehicle is turned over, the slider 9 and the driving tape 19 simultaneously move upward in FIG. 4, and, at the same time when the inclined side portion 22 of the driving tape 19 comes into contact with the forward end of the release arm 32, the head 10 of the slider 9 is also engaged with the locking lever 34. Consequently, the slider 9 is engaged with the locking lever 34 being held in the condition of being projected into the sliding groove 15, whereby the slider 9 is not allowed to move into the advancing end portion 14A, so that the occupant can be kept restrained by the webbing 1.

In the case the occupant wants to leave the vehicle, if he opens the door, then the motor 27 is reversely driven, whereby the driving tape 19 move the slider 19 from the retracting end portion 14B to the advancing end portion 14A of the guide rail 14. In this case, the driving tape 19 and the slider 9 can relatively move with each other by the allowance L of the fastening hole 21, whereby the driving tape 19 moves first a distance corresponding to the length L, and thereupon, the slider 9 begins to move. Consequently, the slider 9 has not reached the locking lever 34 at the time when the inclined side portion 22 reaches the forward end of the release arm 32. Then, the inclined side portion 22 of the driving tape 19 can push the release arm 32 into the housing 30 against the biasing force of the spring 35, and at the same time, the locking lever 34 is also pushed into the housing 30, and thereafter, the slider 9 can pass in the direction of the advancing end portion 14A.

When the slider 9 is moved forward to a position indicated by two-dot chain lines in FIG. 1 as described above, the webbing 1 is separated from the occupant's seat 28 and automatically unfastened from the occupant, so that the occupant can easily leave the vehicle.

Additionally, in the abovedescribed embodiment, description has been given of the case where the driving tape 19 is used as the driving member and the tape groove 10 is used as the driving groove. However, a rope or the like may be used as a driving member and a rope passage groove or the like may be used as a driving groove. In the case such a rope is used, it is necessary that a portion of the abovedescribed driving tape having the fastening hole 21 and the inclined side portion 22 is connected to the forward end of the rope, so that the rope and the slider can relatively move with each other by a given length in the traveling directions of the rope and the slider.

As has been described hereinbefore, the webbing slider lock mechanism according to the present invention can offer such an advantage that the locking and unlocking of the slider can be reliably obtained by a simplified construction.

It should be apparent to one skilled in the art that the abovedescribed embodiment is merely illustrative and the many possible specific embodiments of the present invention are possible. Numerous and varies other arrangements can be easily devised by those skilled in the art without departing from the spirit and scope of the invention.

What is claimed is:

1. A webbing slider lock mechanism for a passenger restraint system in a vehicle, said mechanism comprising:
    a guide rail in the vehicle, said rail having a sliding groove and a driving groove; said rail having a restraining and a releasing end;
    a slider movable within and along said sliding groove and connected to an end of an occupant restraining webbing;
    a release arm having a connecting bar, said arm being projectable into said driving groove at the restraining end of said guid rail;
    a locking lever below said release arm at said restraining end of said guide rail, said lever being projectable into said sliding groove to lock said slider, said lever being engagable by said connecting bar of said release arm;
    means for biasing said release arm and said locking lever to project respectively and simultaneously into said driving groove and into said sliding groove; and
    a driving member movable within and along said driving groove of said guide rail, said driving member having a longitudinal fastening hole, said slider being received in said hole and being of shorter length than said hole to define a space in the direction of travel of said slider, and said driving member including means for pushing said release arm out of said driving groove.

2. The webbing slider lock mechanism as set forth in claim 1, wherein said slider is moved by the driving member along the guide rail to make it possible to fasten the webbing to the body of the occupant.

3. The webbing slider lock mechanism as set forth in claim 2, wherein said slider comprises a head, a body suspended from the central portion in cross-section of the head and connected to the driving member and a leg extended from the lower end of the body and connected to an anchor plate which in turn is connected to the webbing.

4. The webbing slider lock mechanism as set forth in claim 3, wherein said head of the slider is crowned with shoes made of synthetic resin and movable in the sliding groove of the guide rail.

5. The webbing slider lock mechanism as set forth in claim 1, wherein an anchor pin capable of stopping the slider is fixed in the sliding groove at the restraining end of said guide rail.

6. The webbing slider lock mechanism as set forth in claim 1, wherein said driving member is formed of a tape and said pushing means is the forward end of said driving tape formed with an inclined side portion adapted to abut against the forward end of the release arm to push same out of the driving groove.

7. The webbing slider lock mechanism as set forth in claim 6, wherein said driving tape has a forward end portion, said longitudinal fastening hole is formed in the forward end portion of said driving tape, into which the slider can be inserted to be movable a given distance in the direction of travel of said slider relative to the driving tape.

8. The webbing slider lock mechanism as set forth in claim 7, wherein said driving tape is provided in the intermediate portion thereof in the longitudinal direction with a plurality of openings, so that said driving tape can be driven by the rotation of a sprocket wheel meshing with said openings.

9. A webbing slider lock mechanism for a passenger restraint system in a vehicle, said mechanism comprising:
    a guide rail in the vehicle, said rail having a sliding groove and a driving groove; said rail having a restraining and a releasing end;
    a slider movable within and along said sliding groove and connected to an end of an occupant restraining webbing;
    a release arm having a connecting bar, said arm being projectable into said driving groove at the restraining end of said guide rail;
    a locking lever below said release arm at said restraining end portion of said guide rail, said lever being projectable into said sliding groove to lock said slider, said lever being engagable by said connecting bar of said release arm;
    means for biasing said release arm and said locking lever to project respectively and simultaneously into said driving groove and into said sliding groove; and
    a driving member movable within and along said driving groove of said guide rail and formed of a tape, said driving member having a longitudinal fastening hole which in said slider is received and of shorter length than said hole to define a space in the direction of travel of said slider, and the forward end formed with an inclined side portion adapted to abut against the forward end of said release arm to push said release arm out of said driving groove.

* * * * *